US010668792B2

(12) United States Patent
Stenvers et al.

(10) Patent No.: US 10,668,792 B2
(45) Date of Patent: Jun. 2, 2020

(54) OPENABLE VEHICLE ROOF, COMPRISING DISPLACEMENT KINEMATICS HAVING A COUPLING ROD

(71) Applicant: WEBASTO SE, Stockdorf (DE)

(72) Inventors: Jürgen Stenvers, Stockdorf (DE); Florian Frank, Stockdorf (DE); Daniel Zörb, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/781,496

(22) PCT Filed: Oct. 26, 2016

(86) PCT No.: PCT/EP2016/075846
§ 371 (c)(1),
(2) Date: Jun. 5, 2018

(87) PCT Pub. No.: WO2017/097492
PCT Pub. Date: Jun. 15, 2017

(65) Prior Publication Data
US 2018/0264920 A1 Sep. 20, 2018

(30) Foreign Application Priority Data

Dec. 10, 2015 (DE) .................. 10 2015 121 533

(51) Int. Cl.
*B60J 7/043* (2006.01)
*B60J 7/02* (2006.01)
*B60J 7/19* (2006.01)

(52) U.S. Cl.
CPC ............. *B60J 7/024* (2013.01); *B60J 7/0435* (2013.01); *B60J 7/19* (2013.01)

(58) Field of Classification Search
CPC ............. B60J 7/0435; B60J 7/024; B60J 7/19
(Continued)

(56) References Cited

U.S. PATENT DOCUMENTS

| 2015/0048655 A1 | 2/2015 | Heidan et al. |
| 2018/0022194 A1 | 1/2018 | Holzel et al. |

FOREIGN PATENT DOCUMENTS

| DE | 102011015833 A1 | 10/2012 |
| DE | 102015101747 A1 | 8/2016 |

(Continued)

OTHER PUBLICATIONS

International Search Report for PCT/EP2016/075846 dated Feb. 21, 2017 and English translation submitted herewith (5 Pages).

(Continued)

*Primary Examiner* — Dennis H Pedder
(74) *Attorney, Agent, or Firm* — Fitch, Even, Tabin & Flannery, LLP

(57) ABSTRACT

An openable vehicle roof having a lid element, having displacement kinematics on both sides relative to a vertical longitudinal center plane of the roof, the lid element displacable between a closed position and opening position at least partially opening the roof opening by displacement kinematics. The displacement kinematics each have a first kinematic element and a second kinematic element connected to a coupling rod, which can be detachably coupled to the first kinematic element via a coupling member and be displaced between a coupling position and a decoupling position, in which the coupling member is accommodated by a locking recess of the guide rail. The coupling member is held in its decoupling position by a resilient securing element in the locking recess of the guide rail, said securing element being able to be displaced between a securing position and a releasing position by a positioning element of the displacement kinematics.

9 Claims, 11 Drawing Sheets

(58) Field of Classification Search
USPC ................................ 296/216.02–216.05, 223
See application file for complete search history.

(56) References Cited

FOREIGN PATENT DOCUMENTS

| | | |
|---|---|---|
| EP | 2607125 A1 | 6/2013 |
| WO | 2015/124685 A2 | 8/2015 |

OTHER PUBLICATIONS

International Preliminary Report on Patentability issued against International Application No. PCT/EP2016/075846 dated Jun. 12, 2018.

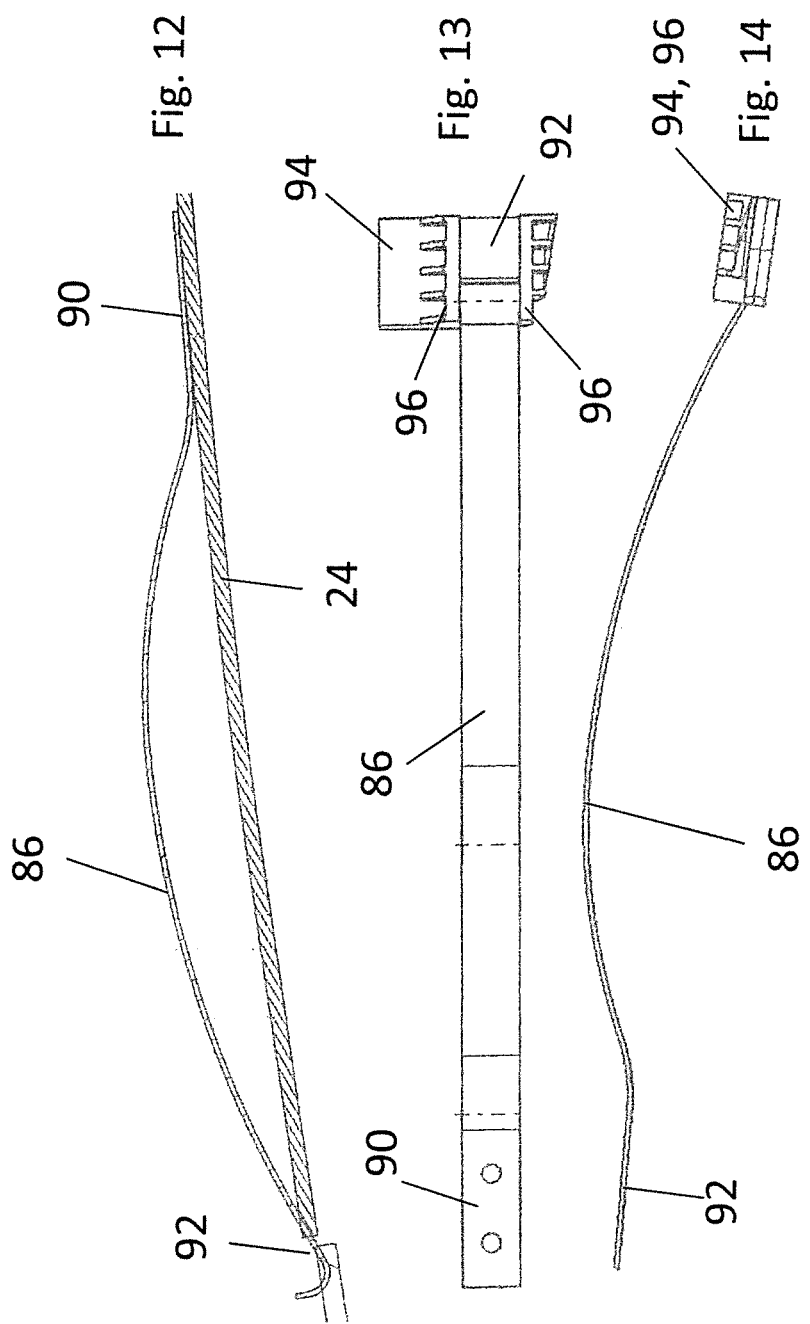

OPENABLE VEHICLE ROOF, COMPRISING DISPLACEMENT KINEMATICS HAVING A COUPLING ROD

CROSS-REFERENCE TO RELATED APPLICATIONS

This application is a U.S. national phase application filed under 35 U.S.C. § 371 of International Application No. PCT/EP2016/075846, filed Oct. 26, 2016, designating the United States, which claims priority from German Patent Application 10 2015 121 533.0, filed Dec. 10, 2015, which are hereby incorporated herein by reference in their entirety for all purposes.

FIELD

This invention relates to an openable vehicle roof having the features of the preamble of claim 1.

BACKGROUND

Such a vehicle is known from practice and represents a so-called spoiler roof having a sliding roof arrangement, for example, in which a lid element movable in the longitudinal direction of the roof can be deployed upward by its rear edge with respect to a fixed-roof section in order to open a roof opening and can be moved above the fixed-roof section towards the vehicle rear. The lid element is coupled to displacement kinematics on both of its two sides relative to a vertical longitudinal center plane of the roof, said lid element being able to be displaced between a closed position closing the roof opening and an opening position at least partially opening the roof opening, in which position the lid element is arranged above the fixed-roof section, by means of the displacement kinematics. The displacement kinematics each comprise a drive carriage, which is guided in a guide track, and a deployment lever, which can be pivoted by means of a coupling rod for deploying the rearward edge of the lid element or rather for lowering the rearward edge of the lid element, said coupling rod being able to be detachably coupled to the respective drive carriage via a coupling member. In a coupling position, the coupling member and therefore the coupling rod are connected to the respective drive carriage, which can introduce a displacement moment in the deployment lever owing to this. In a decoupling position, in which the deployment lever takes up its deployment position, the drive carriage can be moved in the respective guide rail in order to displace the lid element in the longitudinal direction of the vehicle without the deployment lever being actuated via the coupling rod. In the decoupling position, the coupling member of the coupling rod is accommodated by an accommodation of the guide rail. In doing so, however, the risk of the coupling member becoming unintendedly detached from the accommodation of the guide rail exists of its own accord, which can cause an unmonitored actuation of the deployment lever.

SUMMARY

The objection of the invention is to create an openable vehicle roof of the type mentioned above having a coupling rod, whose coupling member is reliably held in the accommodation of the guide rail when in the decoupling position of the coupling rod.

According to the invention, this object is attained by the openable vehicle roof having the features of claim 1.

In the vehicle roof according to the invention, the coupling member is secured by a resilient securing element when in its decoupling position, said securing element being able to be displaced between a securing position and a releasing position by a positioning element of the displacement kinematics. The securing element thus forms an abutment for the coupling member so that it cannot pivot into a releasing position, in which the coupling rod could be displaced in a longitudinal direction of the guide rails, which in turn would lead to the second kinematic element becoming actuated. In order to release the coupling member, it is required for a component of the displacement kinematics serving as a positioning element to actuate the resilient securing element against its resilient force. When displacing the lid element into the opening position, the positioning element releases the resilient securing element, whereby it can secure or rather lock the coupling member of the coupling rod in its accommodation. When the lid element is moved into its closed position, the positioning element actuates the resilient securing element against the resilient force, so that the coupling member is released for a coupling with the first kinematic element. By securing or rather locking the coupling member in the accommodation, it can be effectively prevented that the coupling member is moved or becomes detached from its accommodation via a corresponding stimulation transverse to the guide rail. The resilient securing element therefore inhibits the coupling member from moving and thus the second kinematic element from being actuated, in particular when in an opening position of the lid element. The lock attained by the resilient securing element for the coupling member and thus for the coupling rod is robust and wear-proof and can moreover be produced inexpensively.

It is generally possible for the coupling member to move in an arbitrary transverse direction of the respective guide rail in order to be displaced between its decoupling position and its coupling position. Conveniently, however, the movement path of the coupling member extends in the transverse direction of the vehicle or in the vertical direction of the vehicle when the coupling member is displaced between the coupling position and the decoupling position.

In a particularly inexpensively produced embodiment of the vehicle roof according to the invention, the securing element is a leaf spring, which is fixed to the guide rail and against which the coupling member abuts in the securing position. The leaf spring conveniently comprises a curved shape when in a relaxed or unactuated state and can be pressed down by the positioning element in order to release the coupling member and be pressed into an at least nearly flat arrangement.

When realizing the resilient securing element as a leaf spring, it is in particular riveted or screwed together with the guide rail. Steel or spring steel, for example, is suitable as a material for the leaf spring.

In order for the leaf spring to be compensated in length in the longitudinal direction of the rail when being pressed down and to thus not take up a false position, the leaf spring interacts with a guide element, which fixedly arranged on the guide rail, at its lateral edges in a specific embodiment of the vehicle roof according to the invention. This guide element can be formed by an insert of the guide rail or also by ribs or other walls of the corresponding guide rail.

In a preferred embodiment of the vehicle roof according to the invention, which enables reliably actuating the securing element, the positioning element is the first kinematic element, which releases the securing element, for example, when being moved for displacing the lid element into its opening position and moves onto and presses down the securing element when displacing the lid element into its closed position.

In a specific embodiment of the vehicle roof according to the invention comprising a locking lever, which is pivotally stored on the lid element and which interacts with the first kinematic element, for securing the lid element against being displaced in the longitudinal direction of the vehicle, the locking lever can form the positioning element or also only carry out a pilot control of the resilient securing element before another positioning element, which is formed in particular by the first kinematic element, moves onto the resilient securing element and displaces it into the releasing position.

In order to ensure that the locking lever interacts with the securing element with as little friction as possible, the locking lever can comprise a positioning surface formed by plastic injection molding.

Moreover, the resilient securing element can comprise a slide coating for reducing the friction coefficient.

Generally, the second kinematic element can be any arbitrary component which can be coupled to the drive carriage for being actuated via the coupling rod. In particular, the second kinematic element is a deployment lever for the lid element, which preferably can be pivoted by means of the coupling rod and by means of which the lid element can be moved from its closed position, in which the roof opening is closed, into a extended position, which can be a so-called ventilation position of the lid element.

A specific embodiment of the vehicle roof and of the invention shows a so-called spoiler roof comprising a lid element, which is first moved by its rearward edge and then moved rearward below a rearward fixed-roof section when being moved into its opening position. Via the securing element according to the invention, an unintended displacement of the assigned deployment lever operatively connected to the coupling rod and a resting of the lid element on the rearward fixed-roof section and damage thereto are prevented.

The first kinematic element, which can be coupled to the second kinematic element via the coupling rod, is preferably a drive carriage, which can be connected to a drive cable.

Generally, however, the two kinematic elements can be any arbitrary components of a sliding roof mechanism, which can be coupled to each other. It is also conceivable for the two kinematic elements to each represent a lid element of a sliding roof arrangement or two carriages of two lid elements.

Further advantages and advantageous embodiments of the subject matter of the invention can be derived from the description, the drawing and the claims.

An embodiment of an openable vehicle roof according to the invention is illustrated in the drawing in a schematically simplified manner and is further described in the following description.

BRIEF DESCRIPTIONS OF THE DRAWING

FIG. 12 illustrates a longitudinal cut through a leaf spring for securing the coupling rod in a mounted and a relaxed state;

FIG. 13 illustrates the leaf spring in a top view in conjunction with a guide element; and FIG. 14 illustrates a lateral view of the leaf spring and the guide element.

DETAILED DESCRIPTION

Figure 1:
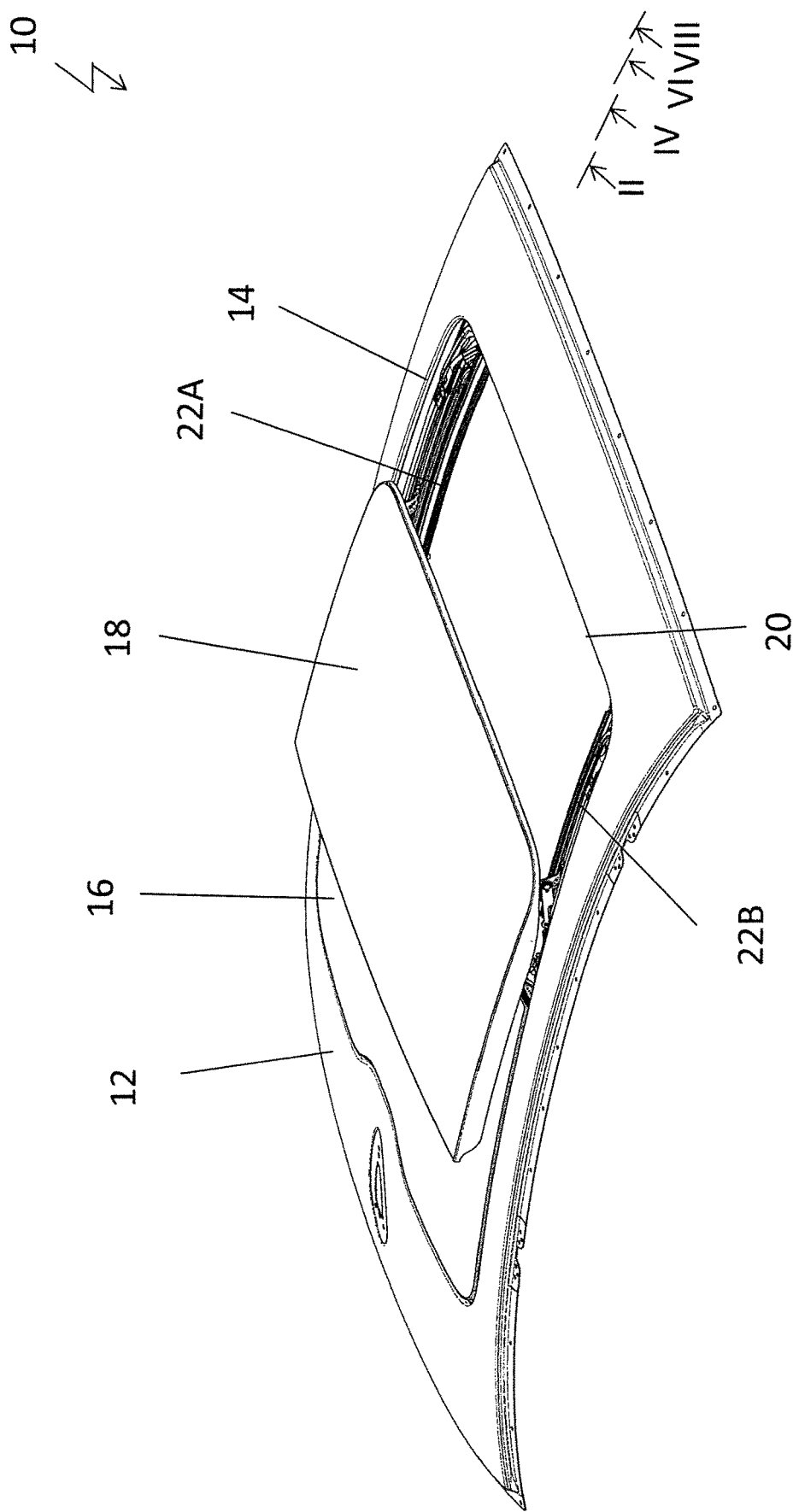
FIG. 1 illustrates a perspective view of a vehicle roof having a sliding roof system realized as a spoiler roof.

In FIG. 1, a roof module 10 is illustrated which can be used as an openable vehicle roof in a passenger vehicle and which can be connected to the design of the passenger vehicle via a circumferential edge.

The roof module 10 comprises a frame-like opaque fixed-roof section 12 surrounding a roof section 14, which can be covered by a first transparent fixed-roof element 16, which is arranged immobile with respect to the fixed-roof section 12 and which forms another fixed-roof section, and by a lid element 18, which can be moved in a longitudinal direction of the roof and which is a component of a sliding roof system designed as a spoiler roof. A roof opening 20, which is delimited by the fixed-roof element 16 from the rear and by the fixed-roof section 12 from the front and the side, can be optionally closed or at least partially released by means of the lid element 18. In order to release the roof opening 20, the lid element 18 is deployed by its rearward edge, which is arranged adjacent to the fixed-roof element 16, starting from a closed position closing the roof opening 20 and is then moved rearward via the fixed-roof element 16 into an opening position in order to release the roof opening 20.

For displacing the lid element 18, the roof module 10 comprises displacement kinematics 22A and 22B on each of its two sides, respectively, relative to a vertical longitudinal center plane of the roof. The displacement kinematics 22A and 22B are arranged mirror-symmetrically to each other, for which reason only the displacement kinematics 22A arranged on the left hand side of the respective vehicle relative to the moving direction of the vehicle will be described in the following for reasons of clarity. The displacement kinematics 22B arranged on the right hand side of the vehicle relative to the moving direction of the vehicle is therefore easily attained as well.

The displacement kinematics 22A illustrated in detail in FIGS. 2 to 14 comprise a guide rail 24, which extends in the longitudinal direction of the roof and which is provided with a guide track 26 for a drive carriage 28, which represents a first kinematic element. The drive carriage 28 is connected to a drive cable 30, which is guided in a cable channel 32 of the guide rail 24 and is driven by means of drive motor (not further illustrated in this instance) for both displacement kinematics 22A and 22B.

On its underside, the lid element 18 is provided with a carrier element 34, which extends in the longitudinal direction of the roof and which comprises a frontward protrusion 36, which is inclined to the front and down and on which a rearward slider 40 is rotationally mounted via a bearing pin 38, said slider 40 being movably guided in a guide channel 42 of the guide rail 24. The guide channel 42 has a front section A, which is assigned to the closed position of the lid element 18 and which transitions to a third section C via a basically S-shaped section B, said section C being arranged in a plane relative to the vertical direction of the respective vehicle, which is located above the plane in which section A is located.

A locking lever 46, which comprises a basically L-shaped slotted track 48, is jointed on the protrusion 36 of the carrier element 34 via an articulate point 44, a slotted pin 50, which is formed on the drive carriage 28, being guided in a displaceable manner in said slotted track 48. The lid element 18 and the drive carriage 28 are thus coupled to each other via the locking lever 46.

Furthermore, a locking element 52 [German: Riegelstein] is formed on the locking lever 46 and engages into a locking recess 54 of the guide rail 24 when in the closed position of the lid element 18, thus securing the lid element 18 from being unintendedly displaced in the longitudinal direction of the vehicle, and is guided in another guide channel 55 of the guide rail 24 when displacing the lid element 18.

In the rearward area of the guide rail 24, a deployment lever 58 is articulated via a rotation point 56, a slider element 60, which is engaged with a guide rail 62 of the carrier element 34, being jointed to the end of the deployment lever 58 facing away from the rotation point 56. The rearward edge of the lid element 18 can be lifted by means of the deployment lever 58 representing a second kinematic element when displacing the lid element 18 from the closed position into the releasing position so that the lid element 18 can be subsequently moved rearward via the fixed-roof element 16 by displacing the carrier element 34 on the slider element 60 of the deployment lever 58.

For actuation, the deployment lever 58 interacts with a deployment carriage 64 which comprises two slotted tracks 66 and 68, in each of which a slotted pin 70 and 72, respectively, of the deployment lever 58 are guided. In the guide rail 24, the deployment carriage 64 is movably guided in a channel 74 and is provided with a coupling rod 76 also guided in the channel 74, said coupling rod 76 carrying a coupling member 78, which comprises a coupling recess 80, at its end facing away from the deployment carriage 64, said coupling recess 80 being able to be engaged with a coupling pin 82 of the drive carriage 28.

In the closed position of the lid element 18, the coupling rod 76 is coupled to the drive carriage 28 via the coupling member 78 and the coupling pin 82. If the drive carriage 28 is then displaced towards the rear, the deployment carriage 64 also experiences a translation towards the rear, whereby the deployment lever 58 is pivoted into its deployed position by displacing the slotted pins 70 and 72 in the slotted tracks 66 and 68. When the deployment position of the deployment lever 58 is attained, the coupling member 78 of the coupling rod 76 takes up a position in the longitudinal direction of the guide rail 24 which corresponds to the position of a lateral locking recess 84 of the guide rail 24.

Thus, the coupling member is released outward relative to the longitudinal center plane of the roof. Due to the shape of the coupling recess 80 of the coupling member 78 extending in the rearward direction and in the direction of the longitudinal center plane of the roof, the coupling member 78 experiences a displacement moment in the transverse direction of the guide rail 24 so that the coupling member 78 immerges in the locking recess 84 and the coupling pin 82 simultaneously emerges from the locking recess 84. Since the locking recess 84 extends in the longitudinal direction of the guide rail 24, which corresponds to the measurements of the coupling member 78, the coupling member 76 as well as the deployment carriage 64 is secured against being displaced in the longitudinal direction. Thus, the deployment lever 58 is in turn secured in its deployed position.

In order to prevent the coupling member 78 from unintendedly detaching from the locking recess 84, a leaf spring 86 representing a resilient securing element is arranged at the bottom of the guide rail, said leaf spring 86 extending in the longitudinal direction of the track with a bulge in the vertical direction and being relaxed when the coupling member 78 is immerged into the locking recess 84. This corresponds to the securing position of the leaf spring 86, in which the coupling member 78 abuts against the leaf spring 86 with its side facing towards the longitudinal center plane of the vehicle.

If the coupling rod 76 or rather the coupling member 78 is to be coupled to the drive carriage 28 when displacing the lid element 18 into its closed position, the locking lever 46 is first moved onto the leaf spring 86 with its pilot control surface 88 arranged on the underside so that the leaf spring 86 is pushed downward contrary to its pretension. Subsequently, the drive carriage 28 is moved onto the leaf spring 86, whereby the leaf spring 86 is completely pressed downward into a nearly flat arrangement and the coupling member 78 is released so as to be coupled to the drive carriage 28. By displacing the drive carriage 28 in the frontal direction, the coupling member 78 experiences a displacement moment in the direction of the vertical longitudinal center plane of the roof owing to the shape of the coupling recess 80 when immerging the coupling pin 82 of the drive carriage 28 into the coupling recess 80, whereby the coupling member 78 is pulled out of the locking recess 84 and the drive carriage 64 is moved in the frontal direction in conjunction with the drive carriage 28 in order to lay down the deployment lever 58. The drive carriage 28 thus forms a positioning element and the locking lever 46 forms a pilot control element for the leaf spring 86.

The pilot control surface 88 of the locking lever 46 is formed from plastic injection molding. The leaf spring 86 is made of spring steel and is riveted to the bottom of the guide rail 24 at its rearward end 90. As can be seen in particular in FIGS. 13 and 14, the leaf spring 86 is guided in a guide element 94 with its unbent frontal end 92, said guide element 94 being an insert of the guide rail 24 and ensuring a reliable longitudinal orientation of the leaf spring 86 owing to two longitudinal ribs 96, between which the frontal end 92 of the leaf spring 86 is guided.

Figure 7:
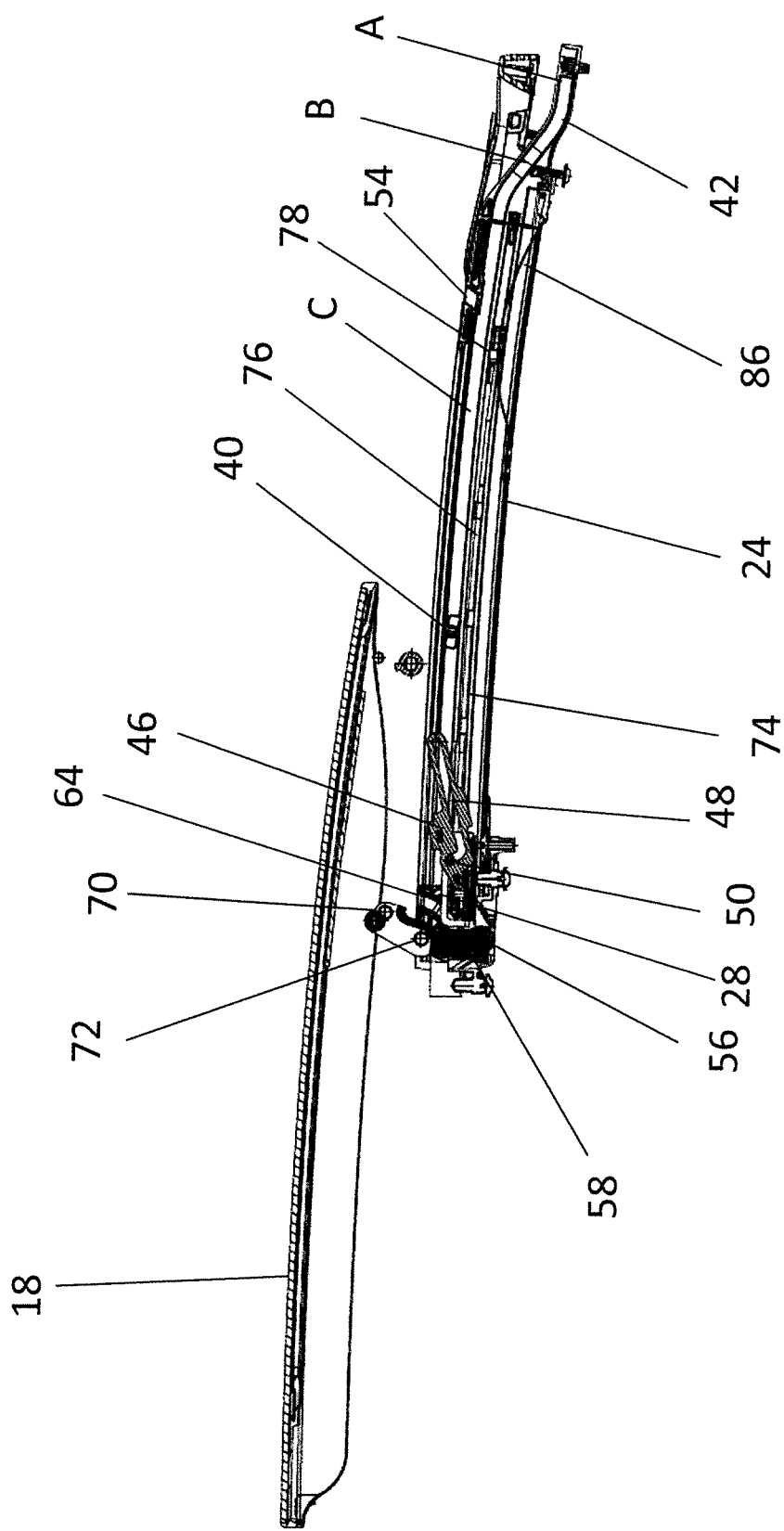
FIG. 7 illustrates a longitudinal cut according to FIG. 6, however in the opening position of the lid element.
Figure 8:
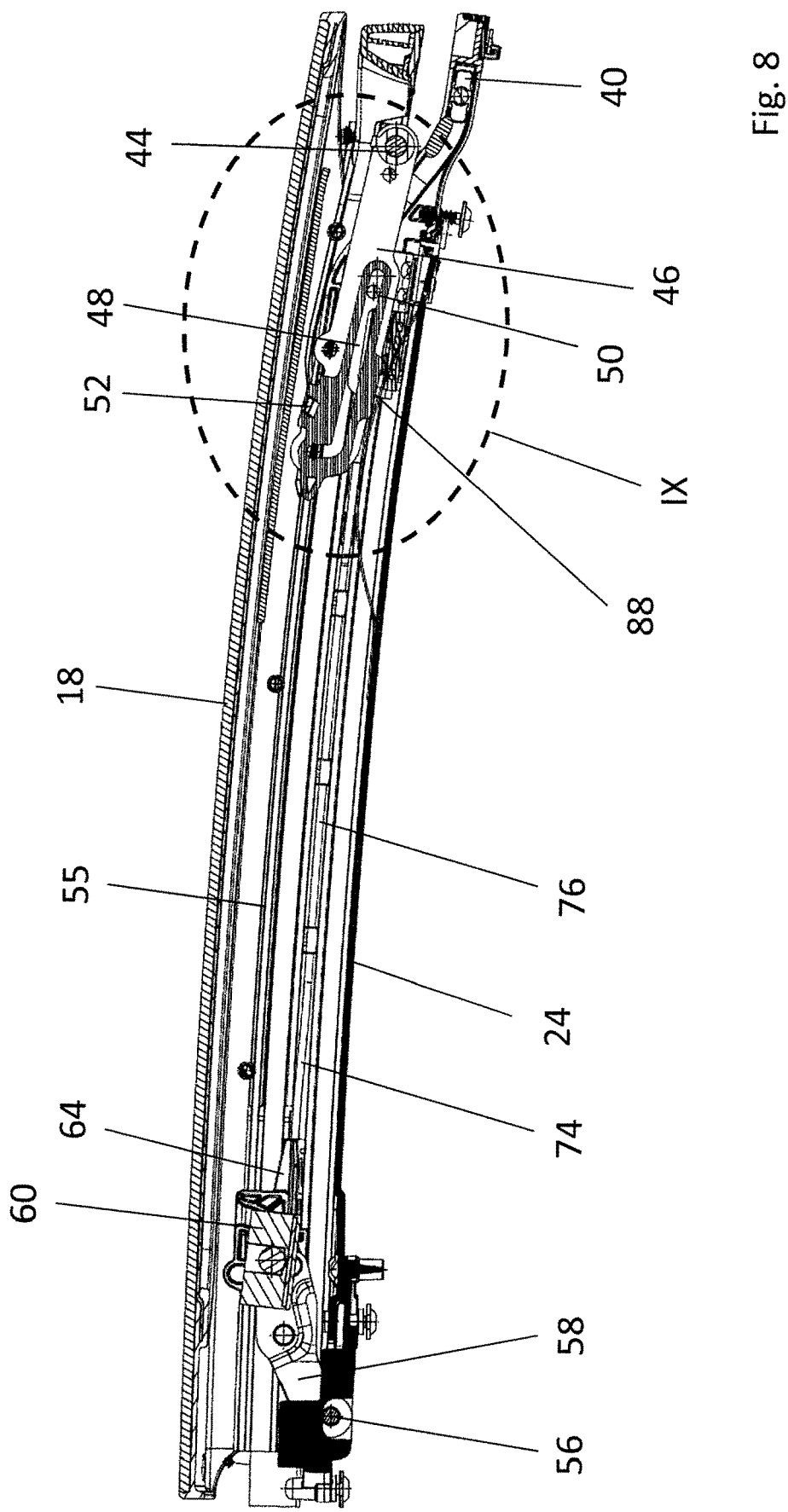
FIG. 8 illustrates a fourth vertical longitudinal cut through the sliding roof system according to line VIII in FIG. 1 in the closed position of the lid element.
Figure 9:
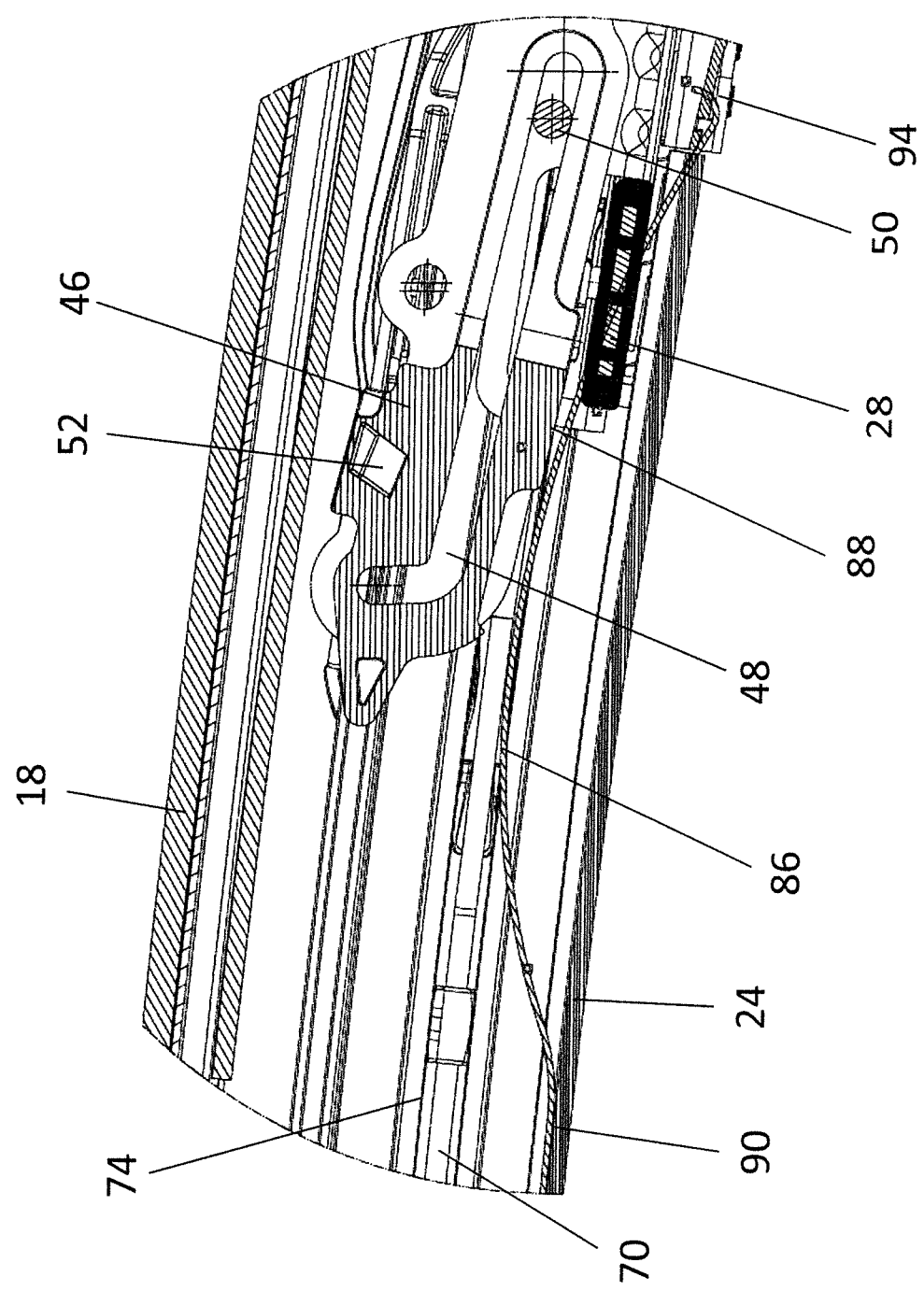
FIG. 9 illustrates an enlarged view of the area IX in FIG. 8.
Figure 11:
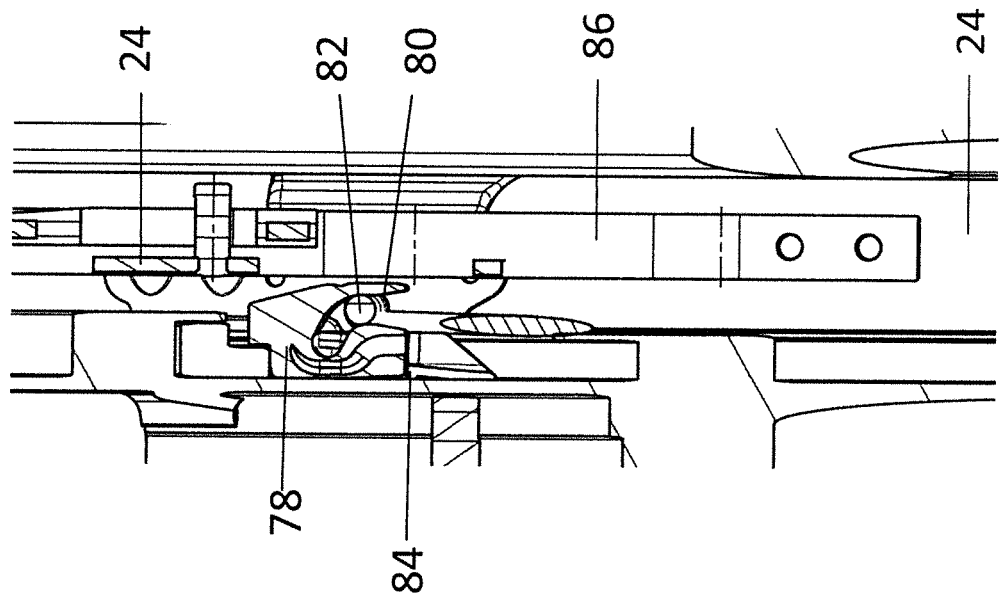
FIG. 11 illustrates a view according to FIG. 10, however in the decoupled state of the coupling rod and the drive carriage.
Figure 10:
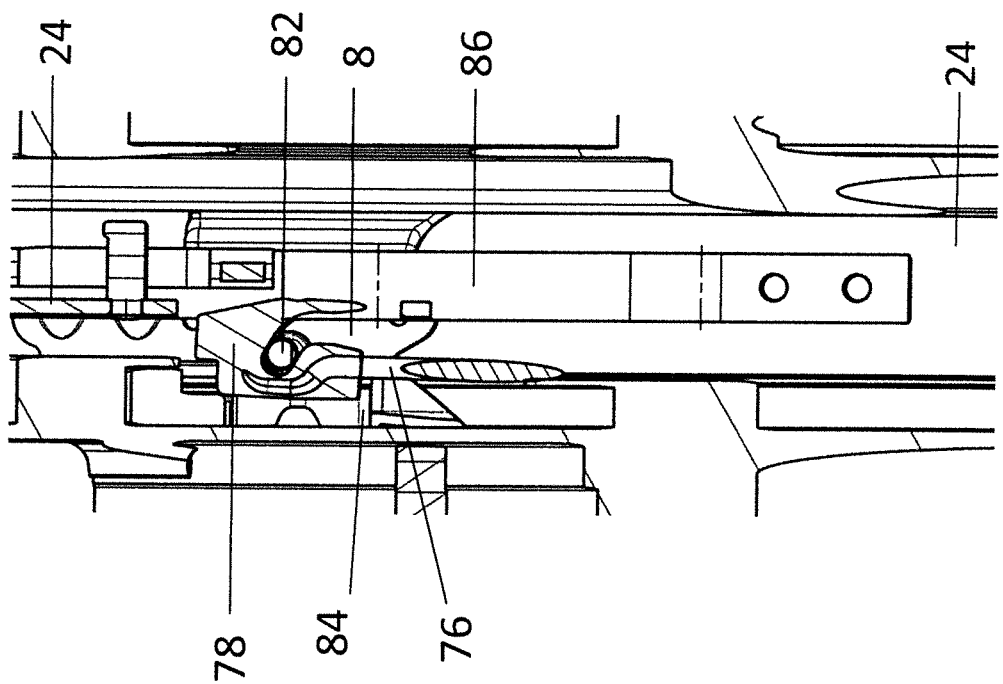
FIG. 10 illustrates a schematic view of a coupling of a coupling rod having a drive carriage of the sliding roof system.

For purposes of presentation in FIGS. 7 and 8, the leaf spring 86 has the bulge assigned to its securing position despite the illustrated closed position of the lid element 18, in which the coupling member 78 is released with respect to the locking recess 84.

The sliding roof system described above functions in the manner described in the following.

Figure 2:
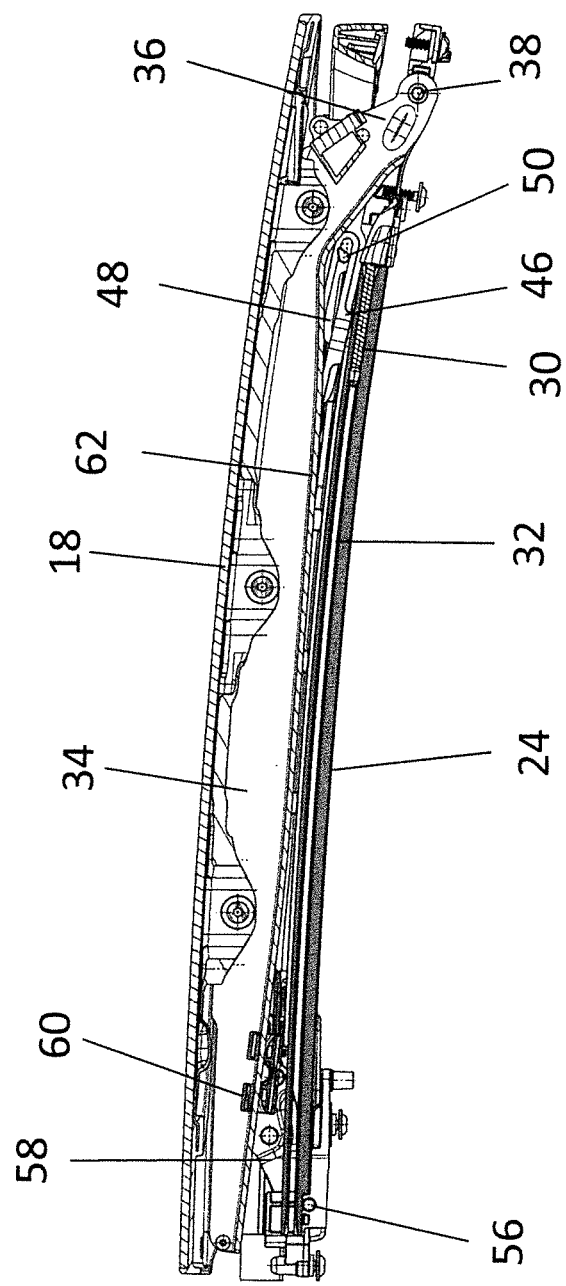
FIG. 2 illustrates a first vertical longitudinal cut through the sliding roof system according to line II in FIG. 1 in a closed position of a lid element, without illustrating fixed-roof elements.
Figure 3:
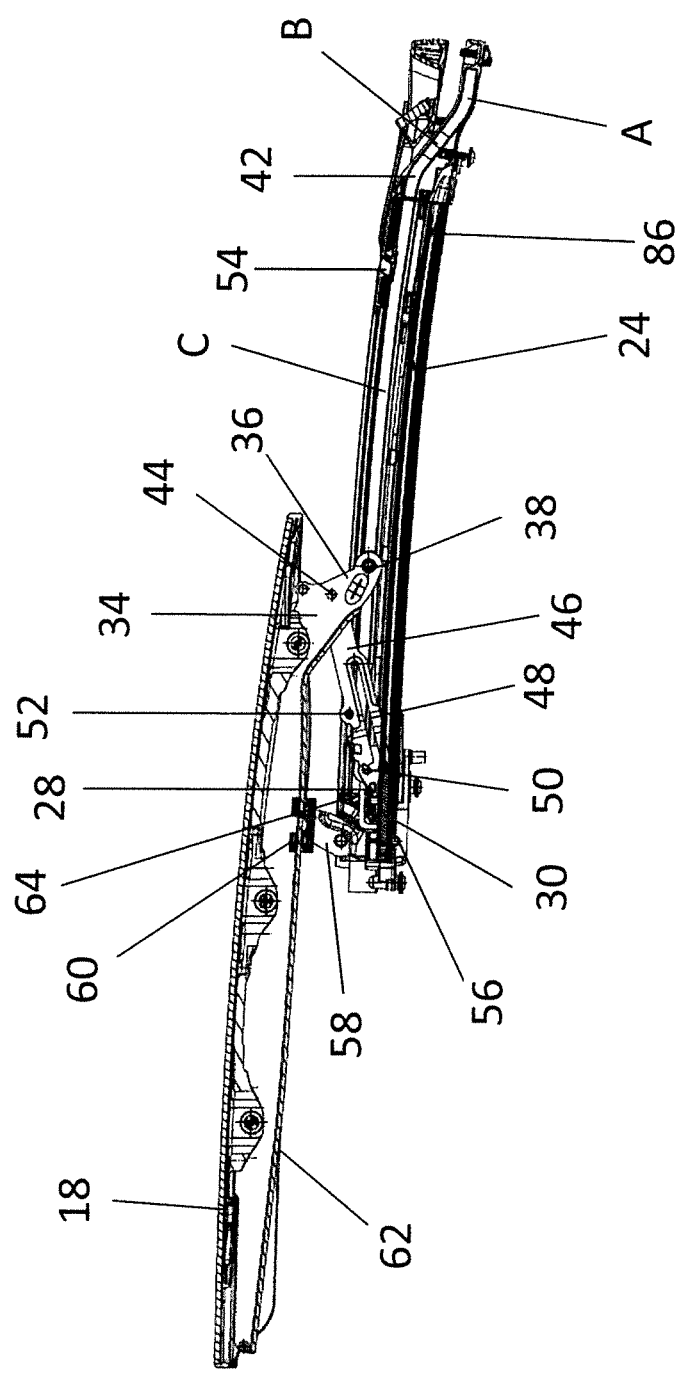
FIG. 3 illustrates a cut according to FIG. 2 through the sliding roof system, however in an opening position of the roof element.
Figure 4:
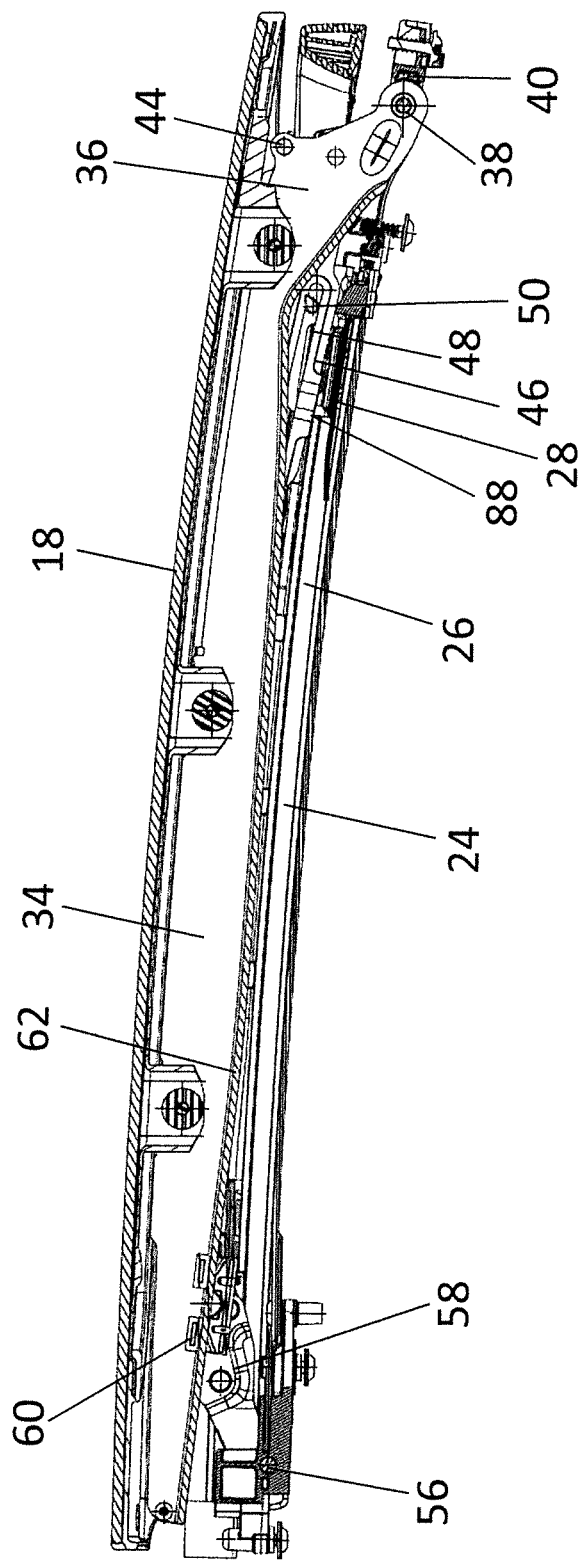
FIG. 4 illustrates a second vertical longitudinal cut through the sliding roof system according to line IV in FIG. 1 in the closed position of the lid element.
Figure 5:
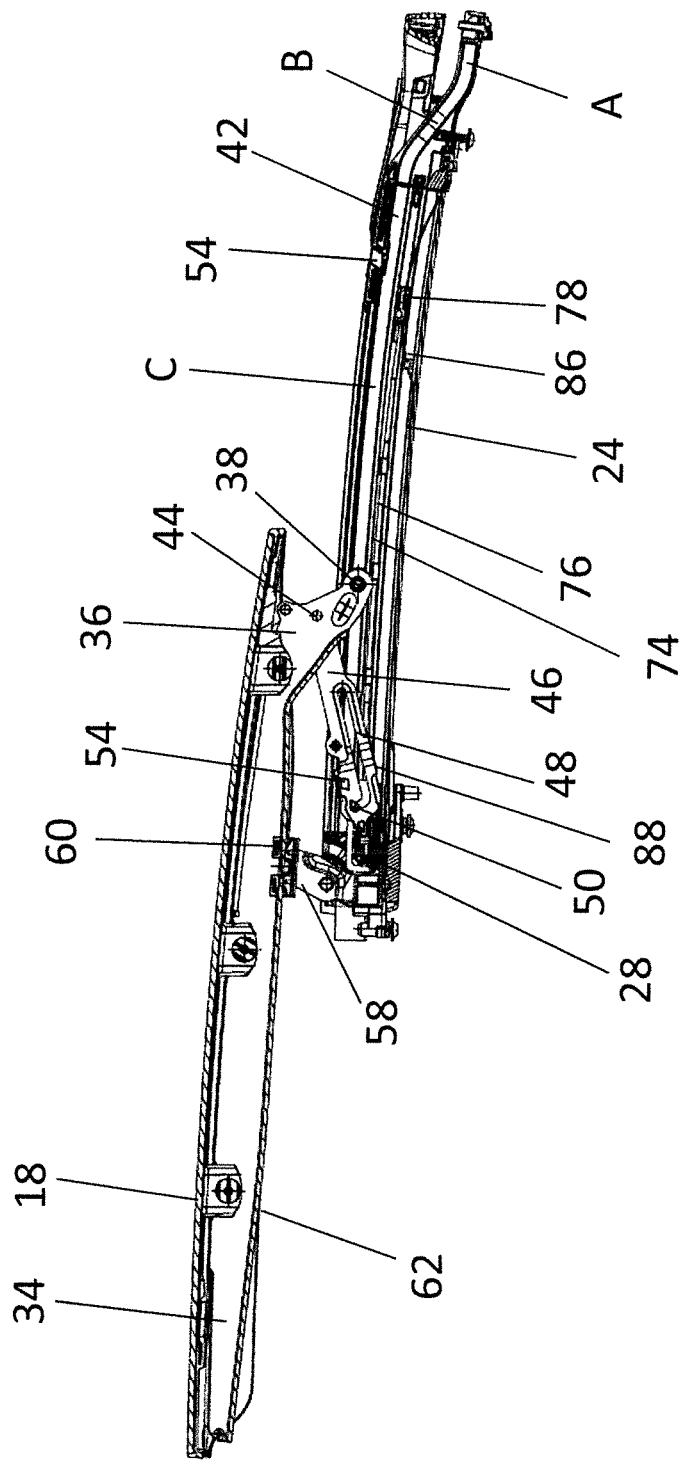
FIG. 5 illustrates a longitudinal cut according to FIG. 4, however in the opening position of the lid element.
Figure 6:
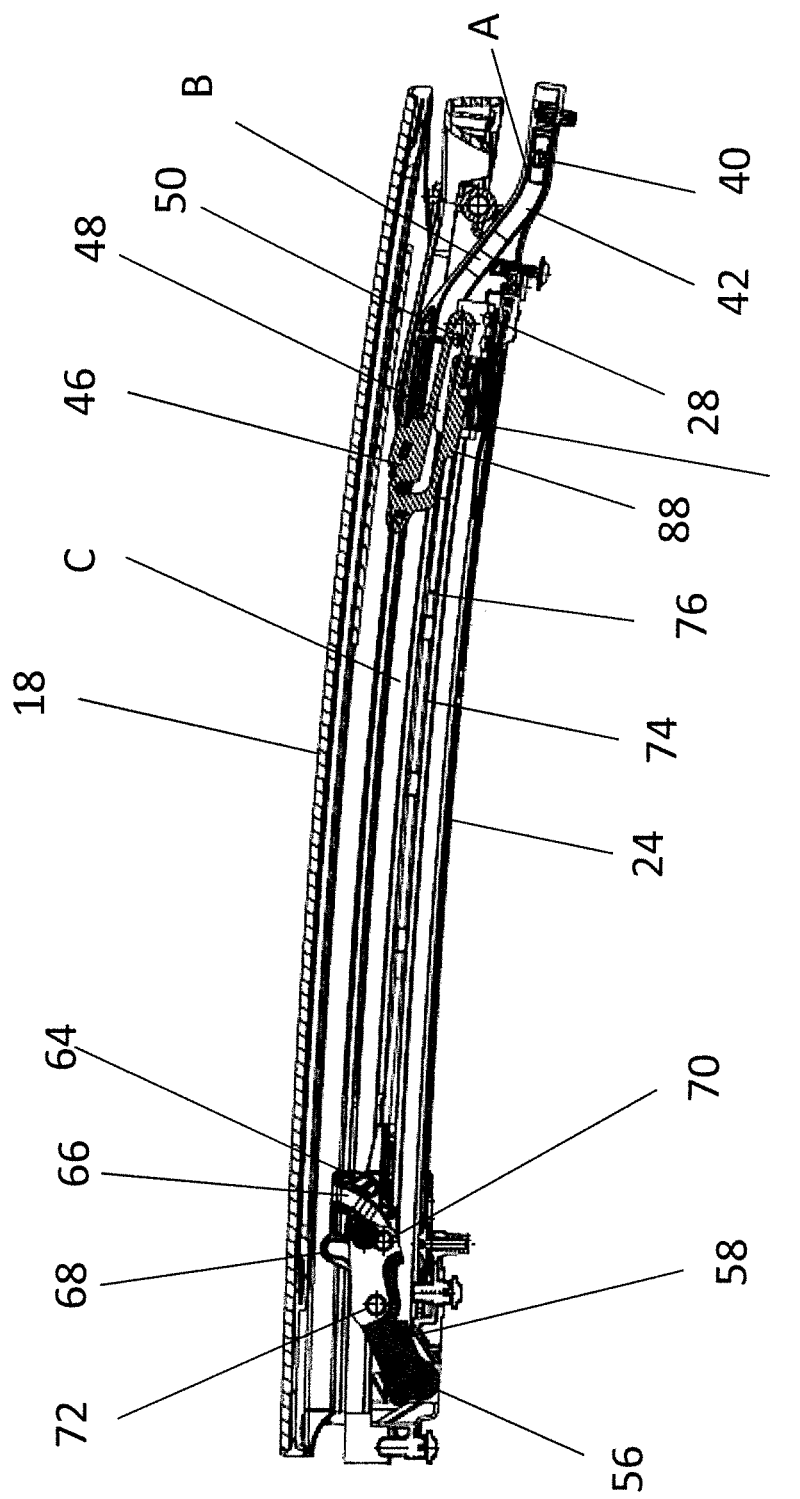
FIG. 6 illustrates a third vertical longitudinal cut through the sliding roof system according to line VI in FIG. 1 in the closed position of the lid element.

Starting from the closed position illustrated in FIG. 2, the drive carriage 28 is displaced rearward, i.e. in the rearward direction, by means of the drive motor. In this context, the drive carriage 64 is coupled to the drive carriage 28 via the coupling rod 76 so that the deployment lever 58 is pivoted and the rear edge of the lid element 18 is raised. In this phase, the slotted pin 50 of the drive carriage 28 passes through the slotted track 48 of the locking lever 46, whereby the slotted pin 50 is pivoted and the locking element 52 is brought from the locking recess 54 into a guide track of the guide rail 24 arranged below. As soon as the deployment lever 58 has attained its deployed position, the drive carriage 28 is decoupled from the coupling rod 76 in the manner already described above, i.e. the coupling member 78 of the coupling rod 76 is brought into the locking recess 84, whereby the deployment lever 58 is secured in its deployed position. At the same time, the leaf spring 86 is also released from the drive carriage 28. Via the resulting bulge of the leaf spring 86, the leaf spring 86 forms a securing element, which holds the coupling member 78 in its locking recess 84. Another method of the drive carriage 28, whose slotted pin 50 then abuts in its short legs against the rear edge of the slotted track 48, causes a translation of the lid element 18 in the rearward direction of the vehicle via the fixed-roof element 16 by means of corresponding tensile strengths on the locking lever 46, which is secured against being pivoted via the locking element 52 in the guide channel 55 of the guide track.

Analogously, moving the lid element 18 into its closed position is carried out in reverse.

LIST OF REFERENCES 10 roof module
12 fixed-roof section
14 roof cutout
16 fixed-roof element
18 lid element
20 roof opening
22A, B displacement kinematics
24 guide rail
26 guide track
28 drive carriage
30 drive cable
32 cable channel
34 carrier element
36 protrusion
38 bearing pin
40 slider
42 guide channel
44 articulate point
46 locking lever
48 slotted track
50 slotted pin
52 locking element
54 locking recess
55 guide channel
56 rotation point
58 deployment lever
60 sliding element
62 guide rail
64 deployment carriage
66 slotted track
68 slotted track
70 slotted pin
72 slotted pin
74 channel
76 coupling rod
78 coupling member
80 coupling recess
82 coupling pin
84 locking recess
86 leaf spring
88 pilot control surface
90 end
92 end
94 guide element
96 longitudinal ribs

The invention claimed is:

1. An openable vehicle roof, comprising a lid element, which is provided with displacement kinematics on each of its two sides relative to a vertical longitudinal center plane of the roof, the displacement kinematics comprising:

a guide rail being able to displace the lid element between a closed position closing the roof opening and an opening position at least partially opening the roof opening and each comprising a first kinematic element and a second kinematic element connected to a coupling rod, which can be detachably coupled to the first kinematic element via a coupling member and be displaced between a coupling position and a decoupling position, in which the coupling member is accommodated by a locking recess of the guide rail, wherein the coupling member is held in its decoupling position by a resilient securing element in the locking recess of the guide rail, the resilient securing element being able to be displaced between a securing position and a releasing position via a positioning element of the displacement kinematics; and wherein the resilient securing element is a leaf spring which is fixed to the guide rail and against which the coupling member abuts in the securing position.

2. The openable vehicle roof according to claim 1, wherein at its lateral edges, the leaf spring interacts with a guide element fixedly arranged on the guide rail.

3. The openable vehicle roof according to claim 2, wherein the guide element is formed by an insert of the guide rail.

4. An openable vehicle roof, comprising a lid element, which is provided with displacement kinematics on each of its two sides relative to a vertical longitudinal center plane of the roof, the displacement kinematics comprising:

a guide rail being able to displace the lid element between a closed position closing the roof opening and an opening position at least partially opening the roof opening and each comprising a first kinematic element and a second kinematic element connected to a coupling rod, which can be detachably coupled to the first kinematic element via a coupling member and be displaced between a coupling position and a decoupling position, in which the coupling member is accommodated by a locking recess of the guide rail, wherein the coupling member is held in its decoupling position by a resilient securing element in the locking recess of the guide rail, the resilient securing element being able to be displaced between a securing position and a releasing position via a positioning element of the displacement kinematics; and wherein the positioning element is a locking lever which is pivotally mounted on the lid element and interacts with the first kinematic element.

5. The openable vehicle roof according to claim 4, wherein the locking lever has a plastic injection molded control surface.

6. The openable vehicle roof according to claim 5, wherein the resilient securing element comprises a slide coating.

7. The openable vehicle roof according to claim 1, wherein the second kinematic element comprises a deployment lever for the lid element, the deployment lever being pivotable by means of the coupling rod.

8. The openable vehicle roof according to claim 1, wherein the lid element is arranged above a fixed-roof section when in its opening position.

9. The openable vehicle roof according to claim 1, wherein the first kinematic element is a drive carriage which is guided in the guide rail.

\* \* \* \* \*